United States Patent [19]
Keshavachar et al.

[11] Patent Number: 6,101,395
[45] Date of Patent: Aug. 8, 2000

[54] METHOD AND APPARATUS FOR OPTIMIZING CALL SETUP TRAFFIC IN A COMMUNICATIONS NETWORK WITH OUT-OF-BAND CALL CONTROL SIGNALING

[75] Inventors: Bhaktha Keshavachar; Duncan Glendinning, both of Chandler, Ariz.

[73] Assignee: Intel Corporation, Santa Clara, Calif.

[21] Appl. No.: 09/023,390

[22] Filed: Feb. 13, 1998

[51] Int. Cl.[7] .................................................. H04Q 7/20
[52] U.S. Cl. ........................................ 455/466; 455/456
[58] Field of Search .................................. 455/466, 414, 455/456, 422

[56] References Cited

U.S. PATENT DOCUMENTS

| | | | |
|---|---|---|---|
| 4,599,490 | 7/1986 | Cornell et al. | 455/414 |
| 5,521,963 | 5/1996 | Shrader et al. | 455/422 |
| 5,598,458 | 1/1997 | Bales et al. | 455/414 |
| 5,781,863 | 7/1998 | Bales et al. | 455/456 |

*Primary Examiner*—Daniel S. Hunter
*Assistant Examiner*—Myron K. Wyche
*Attorney, Agent, or Firm*—Blakely, Sokoloff, Taylor & Zafman LLP

[57] ABSTRACT

What is disclosed is a method and apparatus for optimizing call setup traffic in a communications network with out-of-band call control signaling. The method includes the steps of determining a profile and an associated handle, establishing a communications link with an opposing party; and, transmitting a call setup request containing the associated handle to the opposing party. The apparatus includes a processor, a transmit and receive unit coupled to the processor, and a memory coupled to the processor to cause the processor to perform the method.

20 Claims, 7 Drawing Sheets

CALL CONTROL LAYER ORIGINATING A CALL SETUP REQUEST

CALL CONTROL LAYER RECEIVING A CALL SETUP REQUEST

METHOD AND APPARATUS FOR OPTIMIZING CALL SETUP TRAFFIC IN A COMMUNICATIONS NETWORK WITH OUT-OF-BAND CALL CONTROL SIGNALING

BACKGROUND OF THE INVENTION

1. Field of the Invention

The present invention relates to communications networks. More specifically, the present invention relates to the establishment of communications between parties on a communications network with out-of-band call control signaling.

2. Description of Related Art

Currently, many communication systems use out-of-band call control signaling, which separates the call control portion of the bandwidth from the data portion of a call. The call control portion, which is also known as the call control "layer," is separated from the call data layer to allow the controlling and modification of a call even after a call is in progress. Having a separate control layer also allows the conservation of bandwidth before a call is set-up as the bandwidth needed by the control layer is much smaller than the bandwidth of the data layer. Thus, if a call is not set-up for any reason, the bandwidth reserved for the call data layer is not utilized and only the bandwidth used for the control layer has been used. In addition, a separate call control layer allows more call control capabilities to be implemented as the call control signals are not combined with call data signals.

The call data layer is also referred to as a "bearer" channel, and can be configured for different capabilities. For example, a bearer channel can be voice only, which means that the bearer channel cannot carry other types of data. Alternatively, a bearer channel can be voice and data, which means the bearer channel can carry both voice and data traffic. It is important to know the capabilities of the bearer channel, so that the bearer channel can be used to its full capacity. In addition, a low layer capability (LLC) set of indicators and a high layer capability (HLC) set of indicators are used to describe the different parameters of the communication session.

LLC has information such as the number of stop bits, the number of start bits, and parity bits that are used by the bearer channel. HLC has information such as the coding standard of the data to be exchanged, interpretation information, and protocol information.

An exemplary communication system that uses separate layers for control and data is the integrated services digital network (ISDN) system. The definition of the capabilities of each participation in a communication session is contained in the ISDN call control layer specification, promulgated by the Consultative Committee on International Telephone and Telegraphy (CCITT)/International Telecommunications Union-Telecommunication Standardization Sector (ITU-T) in the Q.931 call control layer specification. The capabilities described for each participant includes the bearer capability, low layer capability, and high layer capability.

In a system such as the Global System for Mobil Communications (GSM) network, a subset of the call control layer specification is used. Thus, each participant only provides support for a portion of the capabilities listed in the Q.931 call control layer specification. However, each participant (i.e., either the mobile stations or the base stations in the GSM network), still transmits a complete profile, which lists all capabilities that the participant is able to support.

When a communications session is initiated, all parties will provide a full set of capabilities as defined by the call control layer specification. During call set-up negotiations, participants will transmit their communication capabilities. The system then arrives at a mutually agreed set of communication parameters by eliminating all non-supported capabilities. Typically, the information transferred for each participant consumes more than 30 bytes of bandwidth in the call control layer.

The transmission of complete profiles occupies bandwidth that would otherwise be conserved for transmission of data. In addition, for mobile stations in a GSM system, as transmission and receipt of information requires the mobile station participant to expend energy, battery life is shortened, resulting in the mobile station requiring frequent recharging or changing of the power source of the mobile station. Thus, what is desired is the reduction of call-setup traffic in systems that operate under requirements such as those contained in the Q.931 specification.

SUMMARY OF THE INVENTION

A method including the steps of determining a profile and an associated handle; establishing a communications link with an opposing party; and, transmitting a call setup request containing the associated handle to the opposing party. An apparatus having a processor; a transmit and receive unit coupled to the processor; and a memory coupled to the processor and causing the processor to determine a profile and an associated handle, establish a communications link with an opposing party, and, transmit a call setup request containing said associated handle to said opposing party.

DETAILED DESCRIPTION OF THE INVENTION

In a communications system where each client transmits one or more sets of capabilities, if there are pre-defined sets of capabilities, then call set-up traffic can be reduced. For example, participants in a GSM network such as mobiles station usually each have well defined set of capabilities. In addition, these sets of capabilities, or "profiles," are typically limited in variety. Therefore, "handles" to each of these sets of defined capabilities can be created to be exchanged between a mobile station and the GSM network. In one embodiment, complete sets of profiles and related handles are stored on both the GSM network and the mobile station. In another embodiment, only the GSM network contains a complete set of profiles while the mobile station contains only a set of profiles that the mobile station can support and a set of handles for the set of profiles.

Figure 1:
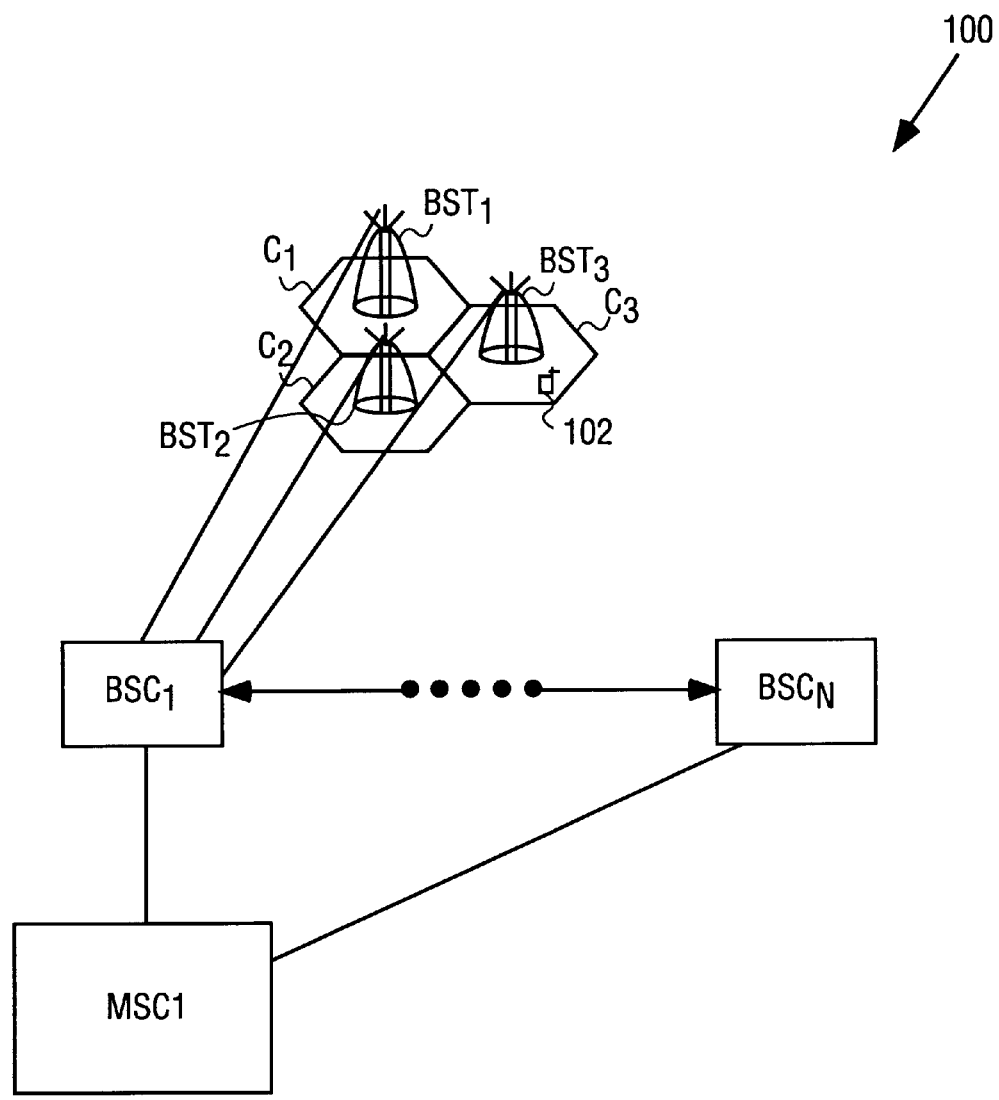
FIG. 1 is a GSM system configured in accordance with one embodiment of the present invention.

FIG. 1 is a GSM system 100 configured in accordance with one embodiment of the present invention, having a set of cells C1, C2, and C3, each having base station transceiver BST1, BST2, and BST3, respectively, located therein. Base station transceivers BST1, BST2, and BST3 communicate with base station controller BSC1 of a set of BSCs BSC1 through BSCn. Set of BSCs is connected to mobile switching center MSC1. A mobile station 102, located in cell C3, communicates with MSC1 using base station BST3 and base station controller BSC1.

As stated above, during call set-up, whether it is initiated by mobile station 102 or mobile switching center MSC1, supported profiles are exchanged between mobile station 102 and mobile switching center MSC1. The Mobile switching center MSC1 exchanges profiles with the mobile station, and stores a full set of profiles that are used in GSM system 100. However, the actual exchange of profiles is effected by the sending of handles, or references, to profiles that are known on both sides, instead of exchanging the actual profiles. This reduces the amount of bandwidth required to transmit a profile, as only the handle for that profile needs to be transmitted. As will be described below, the size of the handle is considerably smaller than the size of the profile.

Figure 2:
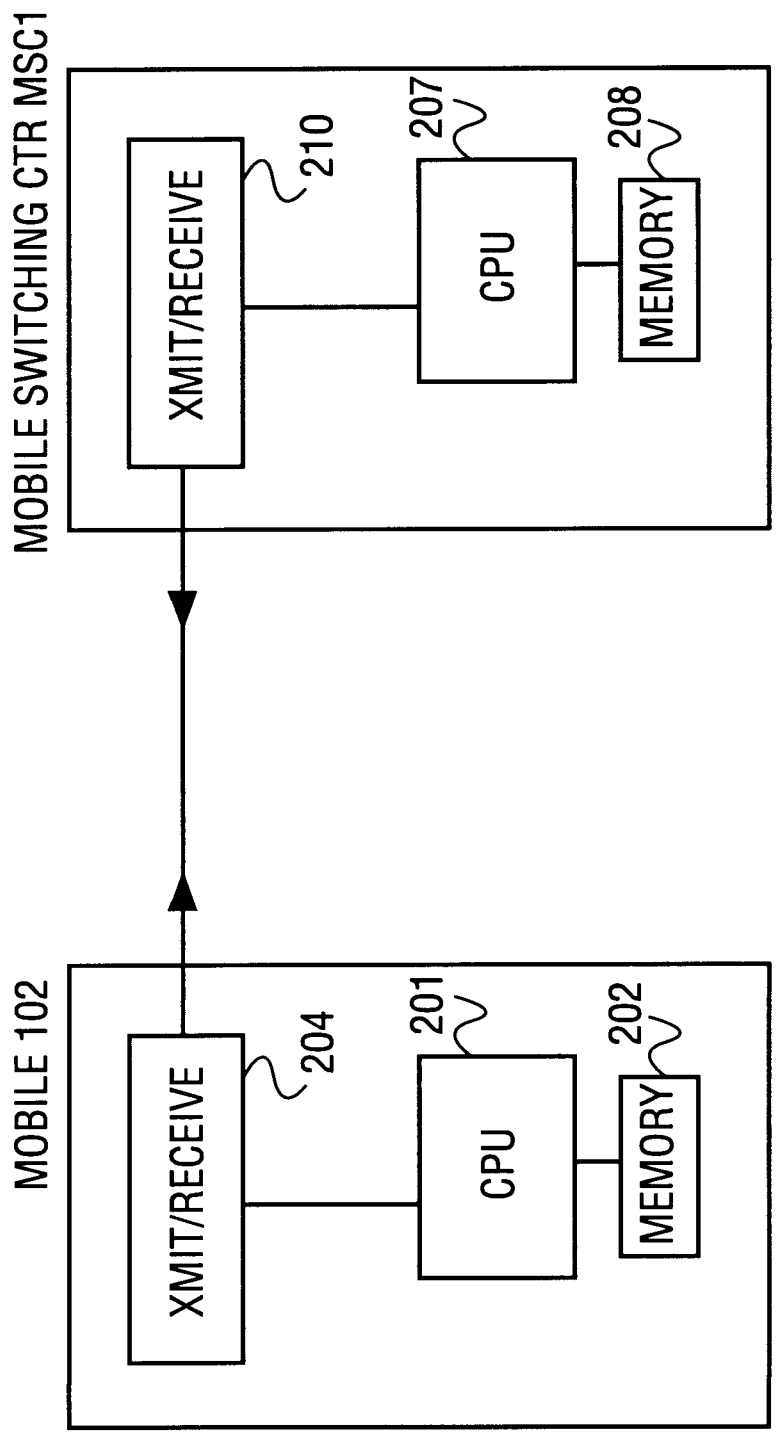
FIG. 2 is a block diagram of a mobile station and a mobile switching center in the GSM system configured in accordance with one embodiment of the present invention.

FIG. 2 is a block diagram of mobile station 102 and mobile switching center MSC1, configured in accordance with one embodiment of the present invention. Mobile station 102 and mobile switching center MSC1 both contain a transmit and receive (XMIT/RECEIVE) unit 204 and 210, a central processing unit (CPU) 201 and 207, and a memory 202 and 208, respectively. Transmit and receive units 204 and 210 are used to communicate with devices on GSM network 100 and with each other. In one embodiment, CPU 201 and 207 are general-purpose processors suitable for use in GSM systems. Memory 202 and 208 are used to store profiles and handles to profiles that are used in accordance with one embodiment of the invention. Memory 202 and 208 are composed of both volatile and non-volatile memory, such as random access memory (RAM), hard-drives, or read-only memory (ROM).

Figure 3:
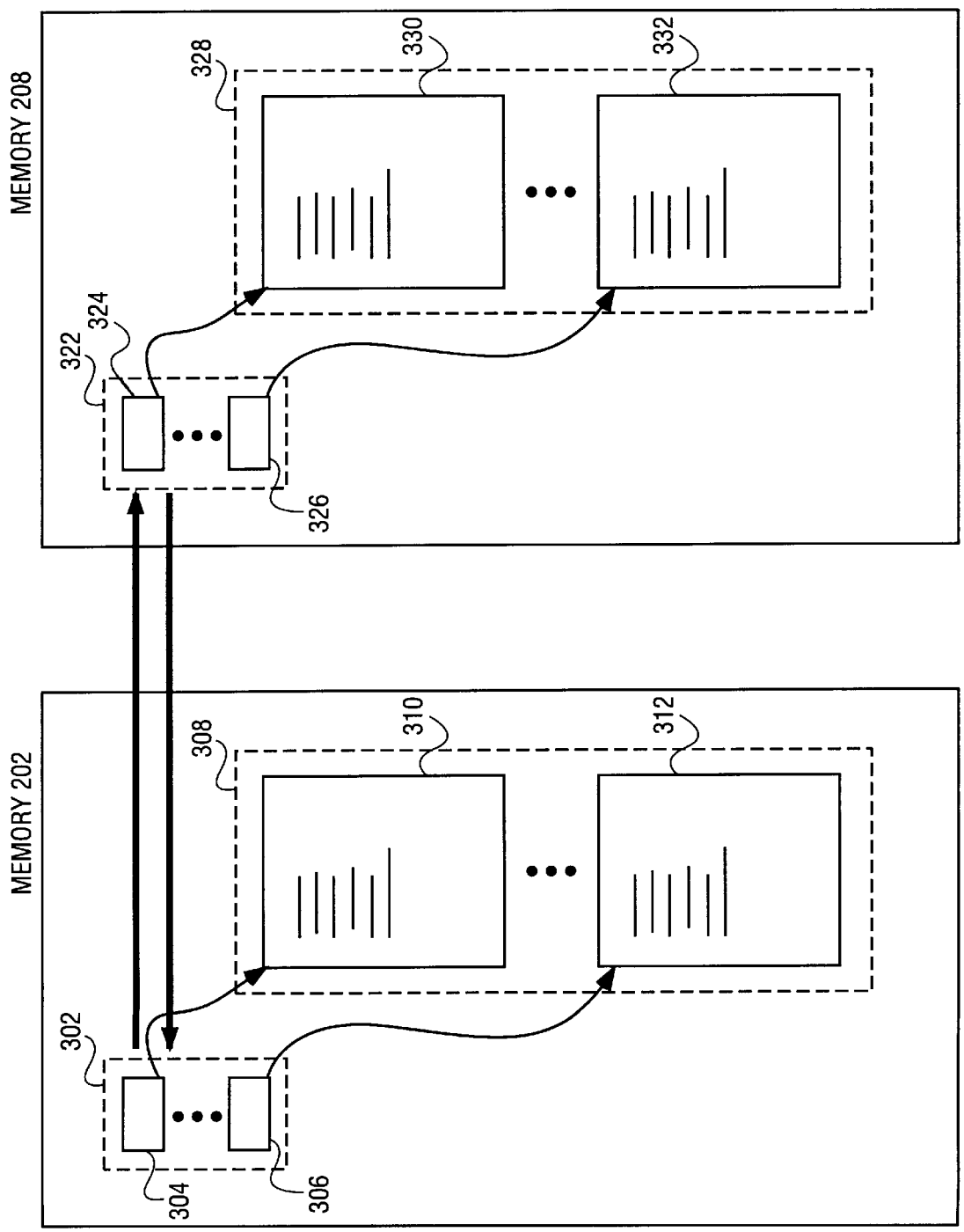
FIG. 3 is a diagram of the memory of the mobile station, and the mobile switching center configured in accordance with one embodiment of the present invention.

FIG. 3 is a diagram of memory 202 and 208, which are configured in accordance with one embodiment of the present invention. Memory 202 and 208 contain a set of handles 302 and 322, respectively. Each handle in set of handles 302 is used to reference a profile in a set of profiles 308. For example, a handle 304 is used to reference a profile 310. Similarly, each handle in set of handles 322 is used to reference a profile in a set of profiles 328. Each handle in sets of handles 302 and 304 are integers in one embodiment of the present invention. Thus, during call set-up, only a set of integers needs to be exchanged. Each device will then determine, from a table look-up, which profile is referenced by the handle. In other embodiments, the handle also indicates the memory address at which a corresponding profile is to be found, thus reducing the decoding and other logic that is needed to retrieve a profile. It is to be noted that a handle is a selector which uniquely identifies a profile within a service environment. For example, a particular handle that references a particular profile in one GSM system can reference a different profile in another GSM system. Therefore, to select an appropriate handle, either: (1) the mobile station is aware of the service environment in which it is operating; or (2) different GSM systems can be synchronized to use the same handle/profile correlations.

It is to be noted that other data that can be contained memory 202 and 208, such as the operating code for the systems, is not shown. Thus, memory 202 and 208 contains the software for the call control layer and other code needed by mobile station 102 and mobile switching center MSC1, respectively, to operate.

Figure 4:
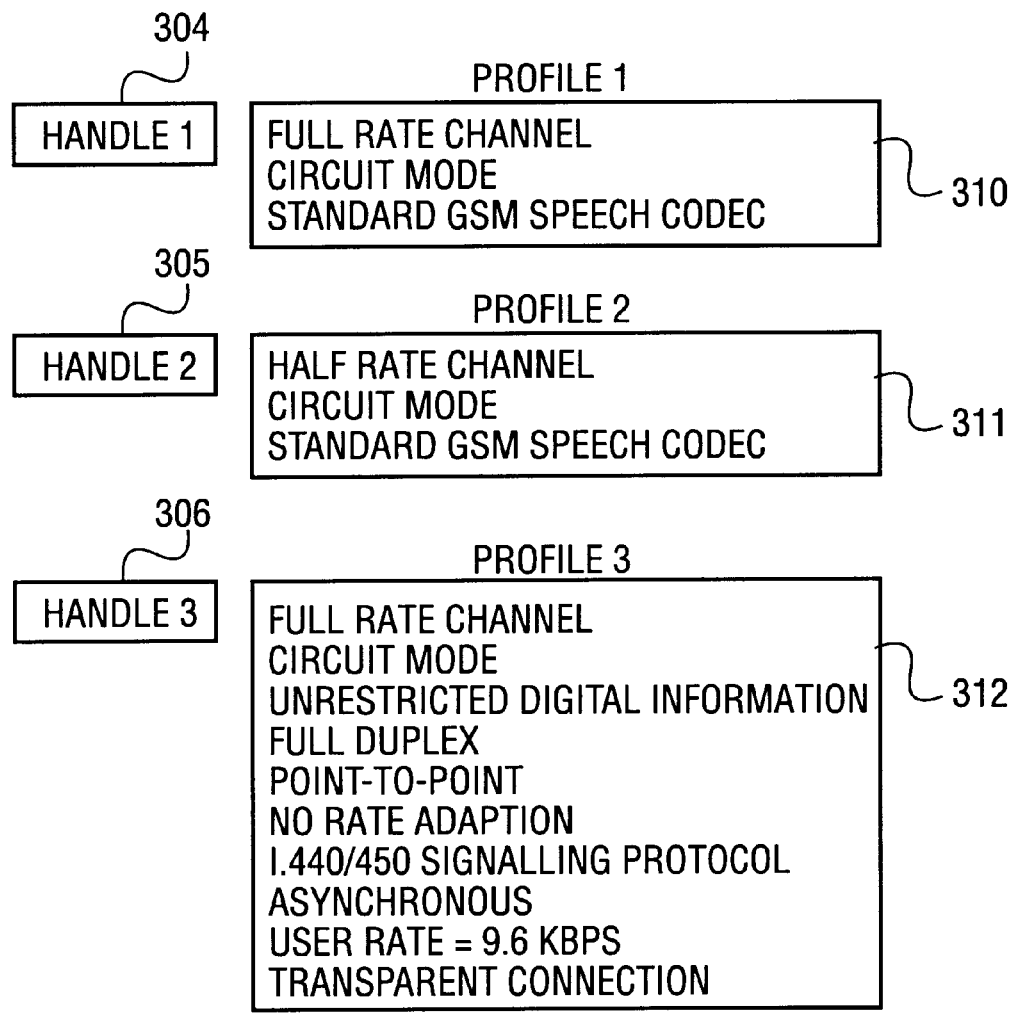
FIG. 4 is a diagram illustrating a set of handles for a set of profiles of the mobile station and the mobile switching center.

FIG. 4 illustrates three profiles 310, 311, and 312 configured in accordance with one embodiment of the present invention. For purposes of describing the profiles, the actual hexadecimal codes that are used to specify the features of the profile have not been used. Instead, text designations of each of the features have been used for ease of explanation. Profiles 310, 311, and 312 are referenced by handles 304, 305, and 306, respectively. In one embodiment, each of handles 304, 305, and 306 are pointers which point to memory locations of profiles 310, 311, and 312, respectively, and each of handles 304, 305, and 306 are identified by a unique number that identifies the handle in GSM system 100.

Profile 310, which is referenced by handle 304, specifies that mobile station 102 can support a communications session for a full rate channel in circuit mode with the standard GSM speech coder/decoder (codec). Thus, mobile station 102 or mobile switching center MSC1 transmits handle 304 if either mobile station 102 or mobile switching center MSC1 wishes to achieve a communications session for a voice call using the full rate channel in circuit mode.

Profile 311, which is the second exemplary profile, differs from profile 311 in that a half rate channel instead of a full rate channel is used for the desired communications session. In this case, the party requesting the particular profile transmits handle 305, which is defined in GSM system 100 as referencing the features supported in profile 311. Thus, all stations in GSM system 100 that are configured in accordance with one embodiment of the present invention have the same handle/profile association.

The third exemplary profile, profile 312, is for a communications session that creates a full rate channel in circuit mode for transporting unrestricted digital information. The digital information will be sent full duplex point-to-point with no rate adaptation using the I.440/450 signaling protocol, which is a CCITT signaling protocol standard in an asynchronous fashion at 9.6 kilobits per second (kbps). In addition, as specified in profile 312, the communications session uses a transparent connection, which means that only the end point devices in GSM system 100 examines the data stream which is sent from either party.

Figure 5:
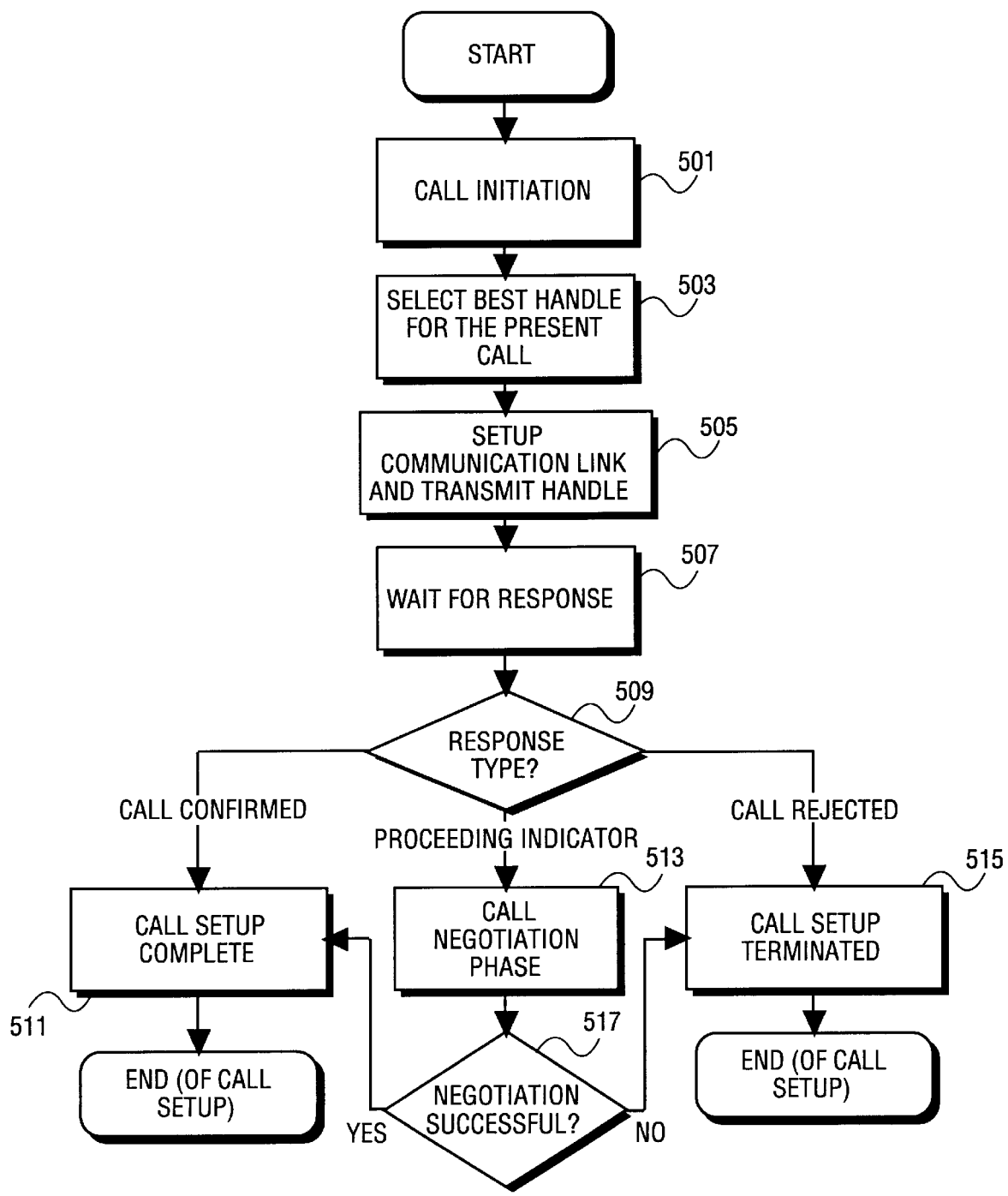
FIG. 5 is a flow diagram illustrating the operation of a call control layer in initiating a call setup request in accordance with one mode of the present invention.

FIG. 5 is a flow diagram illustrating the operation of a call control layer in initiating a call setup request in accordance with one mode of the present invention. FIG. 5 will be described in the context of mobile station 102 (i.e. the call control layer that is contained in memory 202 of mobile station 102) initiating a call setup request to mobile switching center MSC1 (i.e. the call control layer that is contained in memory 208 of mobile switching center MSC1).

The procedure begins with block 501 where a user of mobile station 102 initiates a call. The call that is initiated can be a data-only call, a voice-only call, or a combined voice and data call. After the user initiates a call, operation continues with block 503.

In block 503, software contained in the mobile will select the best profile for the call and then choose an appropriate handle for that profile depending on which type of call the user is trying to establish. Therefore, for example, if the user is sending a data message such as an electronic-mail message, the software for the phone chooses a handle for a data call profile.

In block 505, mobile 102 will set up the link for communicating with mobile switching center MSC1 and transmit the handle for the selected profile to mobile switching center MSC1. As described further in FIG. 7, the handle is transmitted along with a call establishment request (CALL__EST__REQ) message. In alternate embodiments, mobile 102 transmits a set of handles, thereby allowing the receiving party to select among a variety of profiles. In this alternate embodiment, the series of handles would be transmitted in a list that is ordered in order of preference of mobile station 102. For example, if the handles and profiles in FIG. 4 are the only ones available in GSM system 100 and the preferred profile of mobile station 102 for voice calls is profile 310, then the CALL__EST__REQ message sent by mobile station 102 contains a list of handles, with handle 304 listed first, followed by handle 305. After mobile transmits the CALL__EST__REQ message, then operation continues with block 507.

In block 507, the mobile will wait for a response from mobile switching center MSC1. Once a response is received from mobile switching center MSC1, then operation continues with block 509.

In block 509, mobile switching center MSC1 sends back a response and the mobile will determine the response type. In one embodiment of the present invention, the response can either be a call established confirmation (CALL__EST__CNF) message, a call release request (CALL__RELEASE__REQUEST) message, or a call proceeding indicator (CALL__PROC__IND) message.

The CALL__EST__CNF message is sent by the responding party to indicate that the requested profile, as indicated by the handle sent by mobile station 102, is acceptable and communications can be established. In one embodiment, the CALL__EST__CNF message contains the handle for the profile that the responding party has agreed to support. In this example, this handle is the same handle that references the profile that was requested by mobile station 102. In another embodiment, no handle is sent back with the CALL__EST__CNF message, to save bandwidth. In yet another embodiment, a handle is only returned if some negotiation has occurred between the two parties to determine which one of the profiles is to be used.

The CALL__RELEASE__REQUEST message is sent by the responding party if the profile corresponding to the handle requested by mobile station 102 is unreasonably close to what is supportable by mobile switching center MSC1. For example, if mobile station 102 requests a voice call with half-rate encoding, but mobile switching center MSC1 does not support half-rate encoding, then the requested profile would be considered "unreasonably close". Thus, the CALL__RELEASE__REQUEST message is sent when no communications session is established between the two parties.

The CALL__PROC__IND message is sent by the responding party if the profile corresponding to the handle requested by mobile station 505 is reasonably close to what is supportable by mobile switching center MSC1. For example, mobile station 102 requests a communications session with a 9.6 kbps data rate, and mobile switching center MSC1 can only support up to a 4.8 kbps data rate. In one embodiment, the CALL__PROC__IND message contains a new handle to a profile that is proposed by the responding party (i.e., mobile switching center MSC1) as the profile that can be supported by both mobile station 102 and mobile switching center MSC1. In another embodiment, the CALL__PROC__IND message contains a list of handle that references a set of proposed profiles that is supported by the responding party. Usually, after the responding party sends a CALL__PROC__IND message, negotiation occurs between the parties to arrive at an acceptable profile.

In block 511, mobile switching center MSC1 has responded with a CALL__EST__CNF message, which indicates that the profile matching the handle transmitted by mobile station 102 is supportable by mobile switching center MSC1. Thus, call setup is completed in block 511 and the parties can begin communications.

In block 513, mobile switching center MSC1 has responded with a CALL__PROC__IND message, which means mobile switching center MSC1 and mobile station 102 is in a call negotiation phase. In block 513, the call negotiation phase will proceed until either a call is confirmed, which means the call setup has been completed as in block 511, or a call is rejected as described in block 515. In one embodiment, both parties will exchange CALL__PROC__IND messages, each including a proposed set of handles, until one party or the other either accepts the profile proposed by the handle sent by the other party, or terminates the call setup, as described below. During the negotiation session, both parties stores the handles for each iteration of the CALL__PROC__IND message, to not duplicate the transmission of handles that have already been tried.

In block 515, mobile switching center MSC1 has responded with a CALL__RELEASE__REQUEST message, which indicates that the call setup has terminated due to, for example, the profile requested by mobile 102 being completely insupportable by mobile switching center MSC1.

In block 517, if the negotiation between mobile 102 and mobile switching center MSC1 is successful (i.e., a profile has been agreed to for the communications), then operation will continue with block 511 where the call setup is complete. If the negotiation between the mobile and the network is not successful, then operation will continue with block 515, at which point the call setup process will be terminated. After either the call setup process has been completed in block 511 or the call setup has been terminated in block 515, operation for the call setup phase will end.

Figure 6:
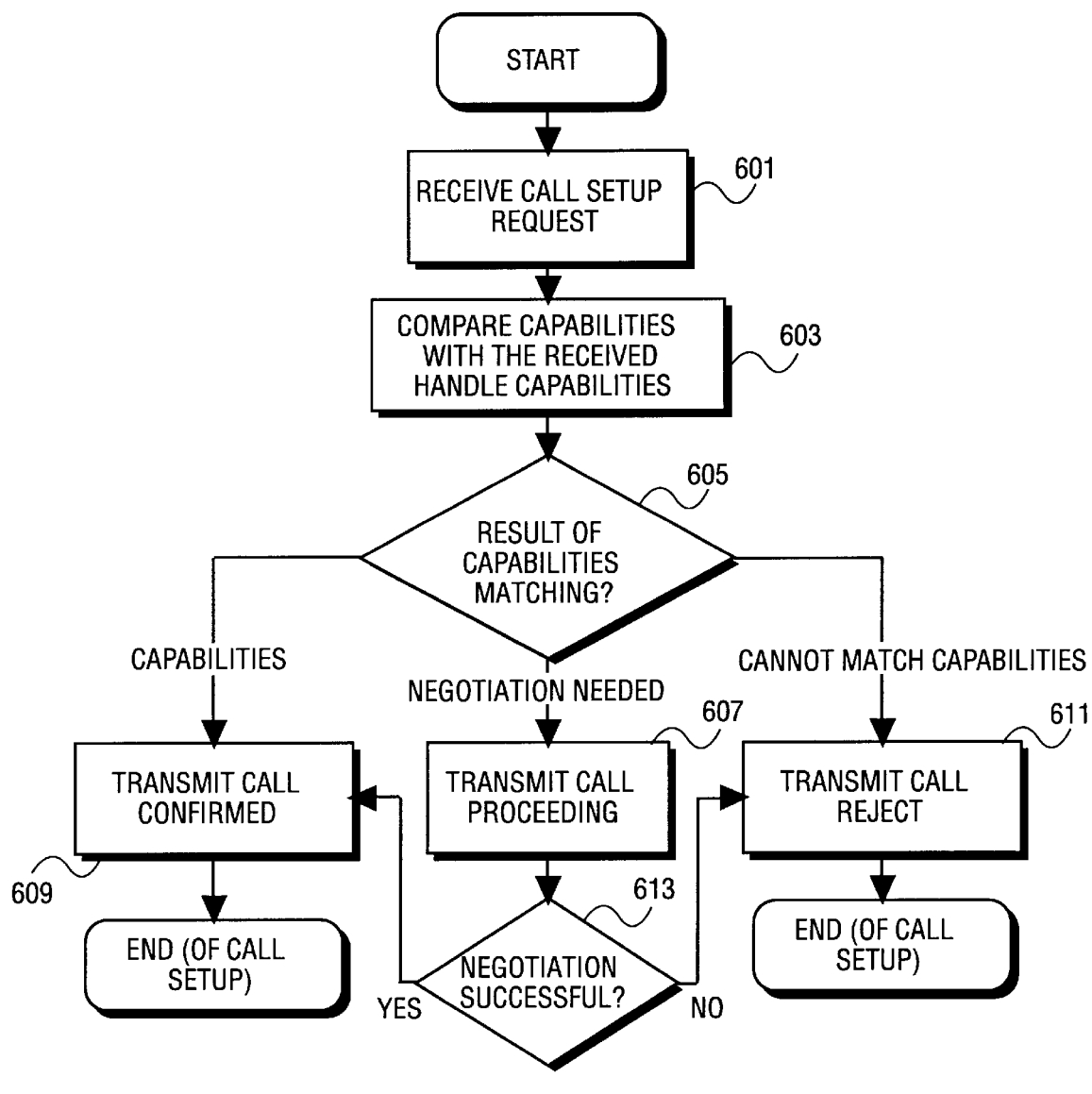
FIG. 6 is a flow diagram for the operation of a call control layer in receiving a call setup request in accordance with one mode of the present invention.

FIG. 6 is a flow diagram for the operation of a call control layer in receiving a call setup request in accordance with one mode of the present invention. FIG. 6 will be described in the context of mobile station 102 (i.e. the call control layer is contained in memory 202 of mobile station 102) receiving a call setup request from mobile switching center MSC1. However, it is to be noted that the description of the operation of the call control layer of mobile station 102 is also applicable to the operation of the call control layer of mobile switching center MSC1. In addition, the description can be applicable to other call control layers contained in devices that are configured in accordance with one embodiment of the present invention.

In block 601, the call control layer receives a call setup request from another party (the "requesting party"), such as mobile switching center MSC1. As described above in FIG. 5, the call setup request contains a handle to a profile that is proposed by the requesting party. As the handle is smaller in size than the actual profile to which it refers, less bandwidth is wasted in transmitting the initial call setup request than if the actual profile were to be sent. After the call control layer receives the call setup request, operation will continue with block 603.

In block 603, the call control layer compares the capabilities of mobile station 102 with the profile that matches the handle that is received in the call setup request. Thus, mobile station 102 looks-up the profile matching the handle that is received in step 601 and determine what capabilities are being requested. Operation then continues with block 605.

In block 605, the call control layer determines the results from the capability-matching algorithm. If the profile requested by the requesting party is matched completely by what is supported by mobile station 102, then operations will continue with block 609. If the profile requested by the requesting party is only partly matched by what is supported by mobile station 102 but is reasonably close to what is supportable by mobile station 102, then operations will continue with block 607. However, if the profile requested by the requesting party is not supportable by mobile station 102 (i.e., the profile requested is unreasonably close to what is supported by mobile station 102), then operations will continue with block 611.

In block 609, mobile station 102 will transmit a call-established confirmation (CALL_EST_CNF) message to the requesting party. The call established confirmation message indicates that mobile station 102 is able to support the profile asked for by the requesting party. In one embodiment, the call established confirmation message includes the handle that was sent by the requesting party. After the CALL_EST_CNF message is sent, operation for the call setup portion of the call is completed.

If the capability matching performed in block 605 results in the determination by the call control layer that mobile 102 cannot match the capabilities in the profile that corresponds to the handle that was received from the requesting party in block 601, then mobile 102 transmits a call release request (CALL_RELEASE_REQUEST) message in block 611. Thus, in block 611, mobile 102 transmits a call release request that terminates the call setup process and terminates the call. As described above, a call can be terminated when there is an unreasonable match between the requested profile and the supported profiles by mobile 102. After the CALL_RELEASE_REQUEST is sent by mobile 102 to the requesting party, then call set-up is terminated and the call is complete.

If, as a result of the capabilities matching performed in block 605, the call control layer of mobile 102 determines that the capabilities requested in the profile of the received handle does not perfectly match the capabilities supported by mobile 102 but is reasonably close, then operation will continue with block 607. In block 607, mobile 102 transmits a call proceeding indicator (CALL_PROC_IND) message with a proposed handle matching a profile that is supported by the mobile. Once the handle for the proposed profile is transmitted, then operation will then continue with block 613.

In block 613, both parties attempts to negotiate an accepted set of capabilities by exchanging handles of supported profiles. If an accepted set of capabilities can be arrived at, then operation continues with block 609, where mobile 102 transmits a call established confirmation. If, in block 613, neither parties is able to arrive at a mutually supported profile, then operation continues with block 611, where the mobile transmits a call release request to the other side. It is to be noted that either party in the communication session can transmit a call release request during the negotiation in block 613 if it is determined that the negotiation has either gone on for too long or one party to the negotiation simply decides to disconnect. Thus, in block 613, either call negotiation is successful and call setup is made, or call negotiation is not successful and call setup is not made. In either case, the call setup process is complete after blocks 609 or 611.

Figure 7:
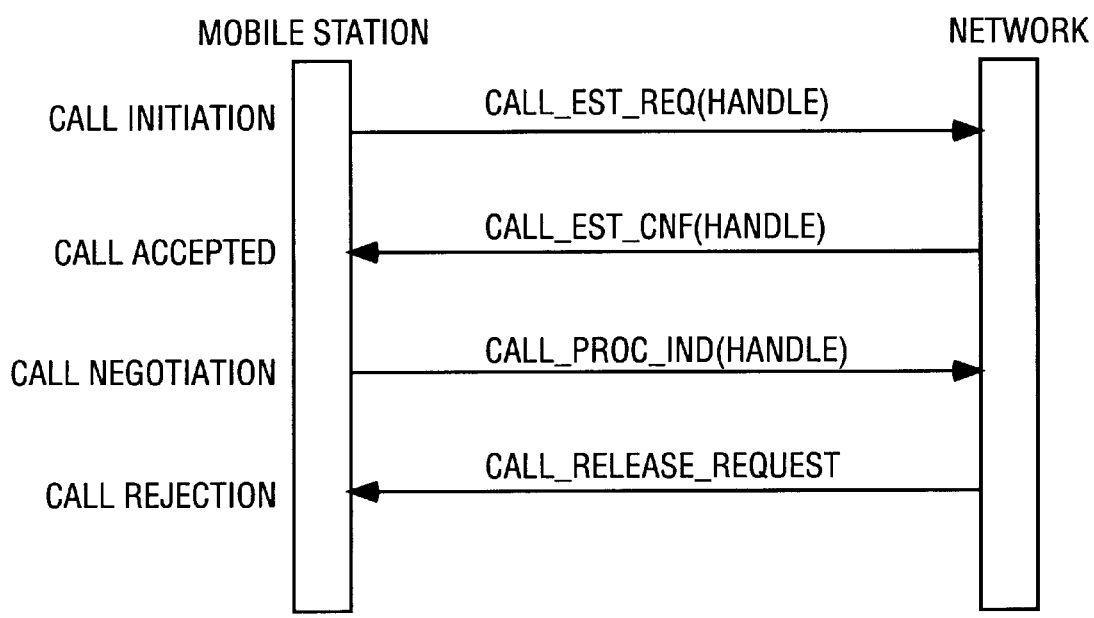
FIG. 7 is a ladder diagram illustrating the call setup process as described in FIG. 5 and FIG. 6.

FIG. 7 is a ladder diagram illustrating the call setup process as described above. In FIG. 7, in the first rung of the ladder (during the first event), mobile station 102 sends a CALL_EST_REQ message, which includes a handle to the profile proposed by mobile station 102 as the profile to use during the communications session, to mobile switching center MSC1. In the next step, after mobile switching center MSC1 processes the CALL_EST_REQ message sent by mobile station 102, mobile switching center MSC1 will return one of three messages: (1) CALL_EST_CNF message (optionally with the same handle that mobile station 102 sent), (2) CALL_PROC_IND message (which includes one or more proposed handles to one or more proposed profiles), and (3) CALL_RELEASE_REQUEST message (which does not include a handle). As discussed above, CALL_PROC_IND message would be sent only if there is a reasonable mismatch between the handle that is sent by mobile station 102 and what mobile switching center MSC1 can conceivably support. The CALL_RELEASE_REQUEST message is sent where there is an unreasonable mismatch from mobile station 102 requesting a profile that includes something that is not supported by mobile switching center MSC1. The CALL_RELEASE_REQUEST message does not include a handle because there would be no handle that mobile switching center MSC1 can return that would be a reasonable match. Mobile switching center MSC1 can also send a CALL_RELEASE_REQUEST message in cases where mobile station 102 is determined not to be a valid user or mobile switching center MSC1 is busy. CALL_EST_CNF message that is sent by mobile switching center MSC1 will sometimes, depending on the embodiment, not include the handle for bandwidth conservation purposes. In cases where the handle sent by mobile station 102 is within a reasonable mismatch between mobile station 102 and what mobile switching center MSC1 can support, both sides will be sending CALL_PROC_IND messages with proposed handles until a match is achieved.

In other embodiments, more than one handle can be transmitted by each device during each call negotiation transmission. By transmitting more than one handle, devices can negotiate the profile to be used if a change was desired after a certain duration of a call. Set-up time can also be reduced as each device now offers two profiles from which the other device can choose.

In another embodiment, the phone numbers used to dial-up a device can be used to identify the capabilities possessed by that device. For example, all mobile stations which support GSM short messaging service (SMS) can have a phone number that ends with an "8". In this embodiment, the GSM network will first send out a proposed profile that includes the capability of supporting SMS when the GSM network first contacts the mobile station. Mobile stations can also store what profiles work with each called number, as each called number usually is assigned to one device. This call directed profile selection eliminates the exchanging of handles after the first time a pair of devices communicates as each device stores a handle to the profile that is used by the other device. Periodic re-negotiation of acceptable operation profiles can be performed, depending on how often each device communicates with each other, and on what the current profile is set.

It is to be noted that the above described system is backwards-compatible with existing systems. Thus, if an entity in the call setup path does not support this new scheme, all participants can fall back to the prior art scheme of transmitting the full set of set-up data. Although some bandwidth is wasted as the amount of data made up of the CALL_EST_REQ message is transmitted unnecessarily, the amount of wasted bandwidth is small as the CALL_EST_REQ message is small. Moreover, a net-savings of bandwidth is realized as more and more devices start to use this scheme. Until all devices on the network supports handles, all devices should continue to work with the prior art scheme to support old equipment.

The present invention saves bandwidth in call setup, and in mobile communication networks, the present invention can also save power expenditure in mobile devices from not having to engage in a lengthy call set-up process.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:

receiving a request to initiate a call being one of a data-only call and a voice-only call;

selecting one of a plurality of pre-defined call profiles responsive to the request to initiate the call, each call profile being associated with a respective handle, each call profile defines one or more parameters, including one or more of data rate in a channel, data rate adaptation, full/half duplex, and speech codec type, for communication between a mobile station and a mobile switching center;

establishing a wireless communications link with an opposing party; and, transmitting a call setup request containing said associated handle to said opposing party.

2. The method of claim 1, further comprising:

receiving a response from said opposing party; and determining if said response is one of a call confirmation message, a call release request message, and a call proceeding indication message;

wherein if said response is said call confirmation message, then entering into a communications phase with said opposing party according to the call profile identified by the associated handle; if said response is said call release request message, then terminating said communications link; and if said response is said call proceeding indication message, then entering into a negotiations phase with said opposing party.

3. The method of claim 2, wherein said call proceeding indication message contains a second handle to a proposed profile and said negotiations phase comprises:

determining whether said proposed profile is a supported profile by looking up said proposed profile in the plurality of predefined call profiles using said second handle and then determining whether one or more of the parameters in said proposed profile can be matched;

if said proposed profile is a supported profile, then sending said call confirmation message; if said profile is not a supported profile but is a reasonably close profile, then transmitting said call proceeding indication message; and if said profile is not a supported profile and is an unreasonably close profile, then transmitting said call release request message.

4. The method of claim 3, wherein said negotiation phase continues until one of said call confirmation message and said call release request message is transmitted.

5. The method of claim 3, wherein said negotiation phase continues until one of said call confirmation message and said call release request message is transmitted.

6. The method of claim 2, wherein said call confirmation message includes said associated handle.

7. The method of claim 2, wherein said call proceeding indication message includes contains a second handle to a proposed profile.

8. An apparatus comprising:

a processor;

a transmit and receive unit coupled to said processor; and a memory coupled to said processor and having instructions that when executed by said processor cause:

a request to initiate a call being one of a data-only call and a voice-only call to be received;

one of a plurality of pre-defined call profiles to be selected responsive to the request to initiate the call, each call profile being associated with a respective handle, each call profile defines one or more parameters, including one or more of data rate in a channel, data rate adaptation, full/half duplex and speech codec type, for communication between a mobile station and a mobile switching center;

a wireless communications link to be established with an opposing party; and, a call setup request containing said associated handle to be transmitted to said opposing party.

9. The apparatus of claim 8, wherein said memory contains further instructions that when executed by said processor:

determine if a response from said opposing party to the call setup request is one of a call confirmation message, a call release request message, and a call proceeding indication message; and if said response is said call confirmation message, then enter into a communications phase with said opposing party; if said response is said call release request message, then terminate said communications link; and if said response is said call proceeding indication message, then enter into a negotiations phase with said opposing party.

10. The apparatus of claim 9, wherein said call proceeding indication message contains a second handle to a proposed call profile and wherein said memory contains further instructions that when executed by said processor cause:

said proposed profile to be retrieved from the plurality of predefined call profiles using said second handle; and, if said proposed profile is a supported profile, then send said call confirmation message; if said profile is not a supported profile but is a reasonably close profile, then transmit a second call proceeding indication message; and if said profile is not a supported profile and is an unreasonably close profile, then transmit said call release request message.

11. The apparatus of claim 10, wherein said memory includes further instructions that when executed by said processor cause said negotiation phase to continue until one of said call confirmation message and said call release request message is transmitted.

12. The apparatus of claim 9, wherein said processor, transmit unit, receive unit, and memory are part of a mobile station.

13. The apparatus of claim 9, wherein said call confirmation message includes said associated handle.

14. The apparatus of claim 9, wherein said call proceeding indication message includes contains a second handle to a proposed profile.

15. The method of claim 1 wherein the request is received by a mobile station from a user of the mobile station.

16. An apparatus comprising:

means for receiving a request to initiate a call being one of a data-only call and a voice-only call;

means for selecting one of a plurality of predefined call profiles responsive to the call being initiated, each call profile being associated with a respective handle, each call profile defines one or more parameters, including one or more of data rate in a channel, data rate adaptation, full/half duplex, and speech codec type, for communication between a mobile station and a mobile switching center; and means for transmitting a call setup request containing said associated handle to said opposing party.

17. The apparatus of claim 16 further comprising means for determining if said response is one of a call confirmation message, a call release request message, and a call proceeding indication message.

18. The apparatus of claim 17 wherein said call proceeding indication message contains a second handle to a proposed profile, the apparatus further comprising:

means for determining whether said proposed profile is a supported profile by looking up said proposed profile in the plurality of predefined call profiles using said second handle and then determining whether one or more of the parameters in said proposed profile can be matched.

19. The apparatus of claim 17 further comprising:

means for entering into a negotiations phase with said opposing party.

20. The apparatus of claim 19 further comprising:

means for continuing the negotiation phase until one of said call confirmation message and said call release request message is transmitted.

* * * * *